United States Patent [19]
Fujii

[11] Patent Number: 5,487,328
[45] Date of Patent: Jan. 30, 1996

[54] TOASTER

[75] Inventor: Tadao Fujii, Tokyo, Japan

[73] Assignee: Yamada Electric Ind. Co., Ltd., Tokyo, Japan

[21] Appl. No.: 417,003

[22] Filed: Apr. 5, 1995

[51] Int. Cl.⁶ .................................................. A47J 37/08
[52] U.S. Cl. .............................. 99/390; 99/385; 99/391; 99/401; 219/386; 219/521
[58] Field of Search .................. 99/326–328, 329 R, 99/329 P, 329 RT, 334, 335, 389–393, 385, 399, 401, 402; 219/521, 537, 386, 413, 528, 529, 545

[56] References Cited

U.S. PATENT DOCUMENTS

| | | | |
|---|---|---|---|
| 1,687,712 | 10/1928 | Chandler | 99/390 |
| 2,916,984 | 12/1959 | Strauss | 99/390 |
| 3,524,404 | 8/1970 | Kimura | 99/390 |
| 3,593,648 | 7/1971 | Walters | 99/402 |
| 3,986,444 | 10/1976 | Caudron | 219/521 |
| 4,627,410 | 12/1986 | Jung | 99/390 |
| 4,889,042 | 12/1989 | Hantz et al. | 99/385 |
| 4,972,768 | 11/1990 | Basora San Juan | 99/393 |
| 5,121,678 | 6/1992 | Del Fresno | 99/391 |
| 5,156,637 | 10/1992 | Wai-Ching | 99/402 |
| 5,265,521 | 11/1993 | Belknap | 99/327 |
| 5,385,082 | 1/1995 | Huggler et al. | 99/389 |

*Primary Examiner*—Timothy F. Simone
*Attorney, Agent, or Firm*—Bachman & LaPointe

[57] ABSTRACT

A toaster having a toaster body, and a bread inlet port formed of a longitudinally extended opening opened at the top portion of the toaster body is composed of a pair of heating members respectively including heaters being parallely installed to a lower portion of the inlet port at adjacent a lengthwisely extended side wall of the toaster body horizontally movably toward and apart therefrom, a carriage member downwardly movably installed to the bottom portion of the inlet port to receive the sliced bread inserted therefrom, and a space regulating member including a link of which a first end being pivotably fixed to the widthwisely extended side surface of the heating member at adjacent gravity center thereof and a second end being pivotably supported by the toaster body, and a spring attached to the position where the second end of the link being supported and linearly extended toward the bottom of the carriage member to receive the carriage member moved toward the spring.

6 Claims, 3 Drawing Sheets

TOASTER

BACKGROUND OF THE INVENTION

1. Field of the Invention

The present invention relates generally to a toaster for toasting sliced bread. Specifically, the present invention relates to such toaster which can sufficiently receive the bread having various sliced width by regulating a location of a heating portion installed in the toaster to constantly obtain a desired toast of the bread.

2. Description of the Background Art

A toaster is generally known as an electrical appliance to toast sliced bread with a heater. Conventionally, the toaster includes a bread inlet port formed of a longitudinally extended opening opened at a top portion of a toaster body, and a carriage plate installed to the lower portion of the inlet port to receive the bottom of the inserted bread. The carriage plate is movably supported by a spring being balanced with the upward movement thereof. The plate can operate from the outside of the body wall. The toaster further includes a pair of heating portions having heaters respectively installed to the lower portion of the inlet port to face each other via the carriage plate, and a reflecting plate installed to the heating portion to face with the bread surface inserted.

When the bread is inserted from the bread inlet port, the bottom of the bread is received by the carriage plate, then a knob installed to the outer side wall of the body for linking with the movement of the carriage plate is pressed down to the predetermined position where the downward movement being locked. The heater is activated to generate heat for toasting the bread surface. The lock of the knob is released after the bread is sufficiently toasted, the carriage plate is lifted up by upward spring force. Thus, the toasted bread is come out from the inlet port.

The longitudinally extended opening of the bread inlet port is generally installed to form a pair being parallel at the top portion of the body. In such toaster, the heater is located at the center portion between two openings and two reflecting plates are respectively located between adjacent the paired openings and the heater. Therefore, only one side of the bread inserted into the opening is toasted to remain the other side thereof.

In the conventional toaster, the heating portion of the toaster is fixed to the same location under any conditions. Therefore, when the bread having the sliced width of relatively wider is inserted into the bread inlet port, distance between the bread surface and the heating portion becomes narrower to cause the bread to be burned. On the other hand, when the bread having the sliced width of relatively narrower is inserted, that becomes wider to cause the bread to be insufficiently toasted. Therefore, it is difficult to regulate the toasting rate of the bread having variety of width.

SUMMARY OF THE INVENTION

It is therefore a principal object of the present invention to provide a toaster which can sufficiently receive and hold sliced bread inserted thereinto to obtain sufficiently toasted bread regardless with variation of the sliced width thereof.

In order to accomplish the aforementioned and other objects, a toaster having a toaster body, and a bread inlet port formed of a longitudinally extended opening opened at the top portion of the toaster body is composed of a pair of heating members respectively including heaters being parallely installed to a lower portion of the inlet port at adjacent a lengthwisely extended side wall of the toaster body horizontally movably toward and apart therefrom, a carriage member downwardly movably installed to the bottom portion of the inlet port to receive the sliced bread inserted therefrom, and a space regulating member including a link of which a first end being pivotably fixed to the widthwisely extended side surface of the heating member at adjacent gravity center thereof and a second end being pivotably supported by the toaster body, and a spring attached to the position where the second end of the link being supported and linearly extended toward the bottom of the carriage member to receive the carriage member moved toward the spring. The link is pivotably moved cooperating with the spring force of the spring with the reception of the carriage member to horizontally move the heating member toward and apart from the lengthwisely extended side wall of the toaster body.

The spring of the space regulating member may be located to form a crossed portion with another spring of the faced space regulating member installed to the faced heating member to receive the carriage member.

The link of the space regulating member may be shaped in an approximate I-shape.

A stabilizing member to prevent drifting of the heating member may be installed to the widthwisely extended side surface of the heating member at adjacent gravity center thereof. In addition, the stabilizing member may be parallely installed to the link of the space regulating member to form parallel linking therewith. Further to say, the stabilizing member may be formed of an approximately I-shaped link of which one end is pivotably fixed to the heating member.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENT

Figure 1:
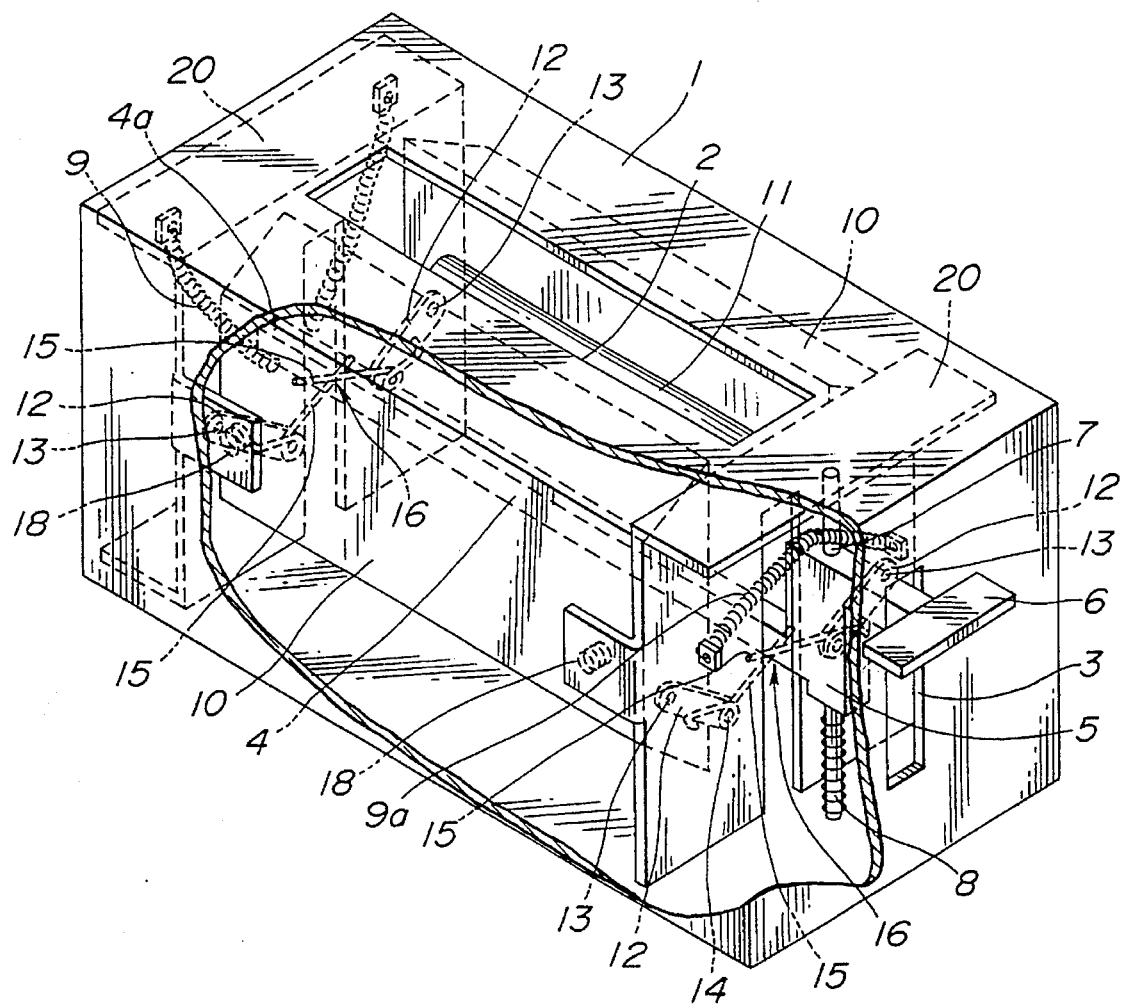
FIG. 1 is a schematic perspective transparent view showing a structure of a toaster according to the present invention.

Referring now to FIG. 1, a toaster includes a toaster body 1 having a rectangular box shape, and a bread inlet port 2 having a longitudinally extended opening opened at the top portion of the toaster body 1 to receive sliced bread. A pair of heating portions 10 are located in the toaster body 1 parallely along with a lengthwisely extended side walls of the toaster body 1, to face each other via the bread inlet port 2, and a pair of plates 20 are located in the toaster body 1 parallely along with a widthwisely extended side walls of the toaster body 1. The upper margin of the plate 20 may be bent toward the widthwisely extended side wall of the toaster body 1.

Guide opening 3 is vertically opened on the widthwisely extended side wall of the toaster body 1. Guide opening is also vertically opened on the widthwisely extended side wall of the plate 20. A bread carriage 4 is horizontally engaged by the guide openings at the both ends thereof to allow the carriage 4 to be vertically movable. A lever 5 is linked with one end of the carriage 4 and projected from the guide openings 3 toward the outside of the toaster body 1. A knob 6 is attached to the exposed end of the lever 5. The lever 5 forms a crank to vertically movably engage with a guide rod 7 vertically mount in the toaster body 1 adjacent along the widthwisely extended side wall thereof. A coil spring 8 is wound around the guide rod 7 to force the lever 5 toward the upward direction.

The bread carriage 4 is located at the lower portion of the bread inlet port 2 across the toaster body 1. An end 4a of the carriage 4 is vertically movably supported by one of the plates 20 via a carriage support spring 9. The both ends of the carriage support spring 9 are fixed to the bent portion of the plate 20. The carriage 4 is constantly horizontally supported by the spring 9 without incline because of the cantilever style thereof. A buffer spring 9a is located adjacent the upper portion of the lever 5 which is installed to the inside of the widthwisely extended side wall of the toaster body 1 to be faced with the carriage support spring 9 via the carriage 4. The buffer spring 9a absorbs inertia force toward the upward direction given to the lever 5 when the lever 5 is raised by the upward force of the coil spring 8 to reach the upper limit position thereof. The buffer spring 9a is horizontally located at adjacent the lever 5 to perpendicularly cross therewith.

In addition, as is conventionally known, a trigger system is also installed in the toaster body 1, though not shown in the figures, to lock the downward movement of the bread carriage 4 in the toaster body 1 when the carriage 4 reaches the lower limit position thereof and to release the lock of the carriage 4 after the bread is sufficiently toasted. The trigger system includes a regulation handle which can regulate toasting rate of the bread.

Figure 2:
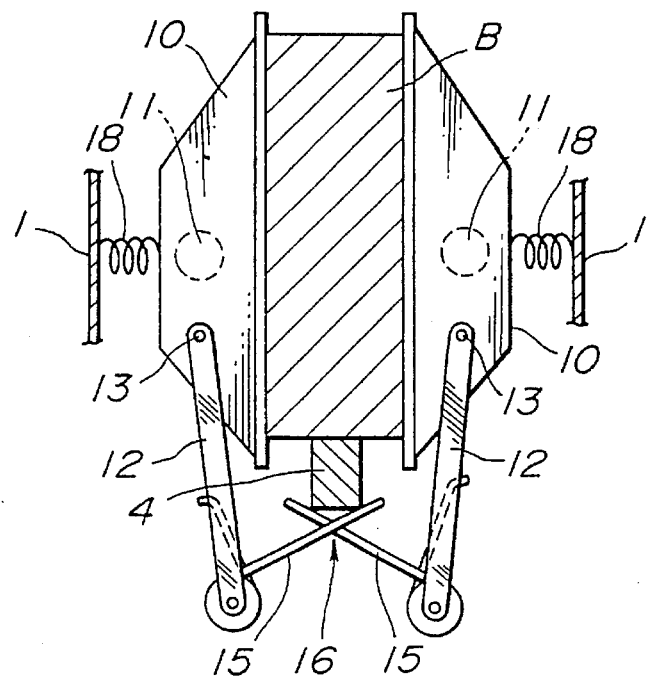
FIG. 2 is a cross-sectional side view showing operation of a principal part of such toaster.
Figure 3:
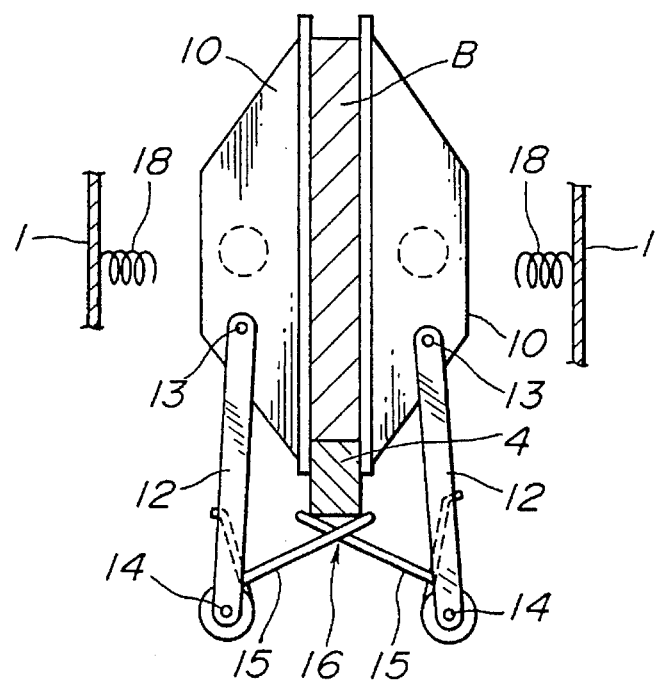
FIG. 3 is a cross-sectional side view showing another operation of the principal part of the toaster.

Referring now to FIGS. 2 and 3, the heating portion 10 is formed of a heat reflecting rectangular box having an opening of mutually faced. A heater 11 is located in the center portion of the reflecting box. A link 12 having an approximate I-shape is connected one end thereof with the center portion of the lengthwisely extended side wall of the heating portion 10 at adjacent gravity center thereof via a shaft 13. Another end of the link 12 is pivotably supported by the toaster body 1 via the plate 20 or an appropriate bracket through a shaft 14. A spring 15 is fixed one end thereof to the lower end of the link 12 winding around the shaft 14 where the link 12 being pivotably fixed to the toaster body 1. Another end of the spring 15 is linearly extended in a predetermined length toward the facing heating portion 10 to form a crossed portion 16 with another spring facingly installed thereto.

The heater 11 of the heating portion 10 is connected with an outer power supply through a code extended from the toaster body 1 with wiring via a connector connected with the code, not shown in figures. The heater may be formed of an appropriate heat generatable substance, such as a nichrome wire and a infrared ray lamp. A pair of springs 18, as shown in FIGS. 1 to 3, are installed to the lengthwisely extended side of the toaster body 1 or to a bent portion of the plate 20 being bent toward the lengthwisely extended side of the toaster body 1 such that the spring 18 can contact with the back surface of the heating portion 10 to regulate the movement of the heating portion 10 toward the toaster body 1 for preventing collision between the heating portion 10 and the toaster body 1.

The toaster of the above-mentioned operates as follows.

Once the sliced bread B is inserted into the bread inlet port 2, the bread bottom is received by the bread carriage 4. The knob 6 is pressed down to the lever 5 and the carriage 4 downwardly move against the spring force of the coil spring 8 until the predetermined position to be locked. Both ends of the carriage 4 are respectively supported by the coil spring 8 and the carriage support spring 9 under this operation, therefore, the end 4a of the carriage 4 is never dropped downwardly to maintain horizontally support of the carriage 4. Thus, the bread B inserted into the bread inlet port 2 is completely held in the toaster body 1. The carriage 4 downwardly moved presses down the crossed portion 16 of the spring 15, as illustrated in FIGS. 2 and 3. The spring 15 is pivotably forced by the carriage 4 to incline the both links 12 facingly installed respectively toward the carriage 4 by the spring force thereof. The faced heating portions 10 are horizontally moved toward the direction close to each other by the movement of the links 12. Thus, the bread B is sufficiently sandwiched by both heating portions 10.

In this operation, the side surface of the sliced bread B having a variety of width, e.g., either a wide slice as shown in FIG. 2 or a narrow slice as shown in FIG. 3, can contact with that of the heating portions 10. Therefore, distance between the bread surface and the heating portion 10 is maintained constantly to allow the bread to be sufficiently toasted.

The lock of the carriage 4 locked the movement thereof is released after the bread B is sufficiently toasted. The lever 5 is upwardly moved by the spring force of the coil spring 8 to keep the carriage 4 apart from the crossed portion 16. The pressure of the spring 15 is released thereby, then the heating portions 10 are moved apart from the bread B by the link lever 12. The carriage 4 contacts with the buffer spring 9a at the upper limit position thereof, then the spring 9a moderates then brakes the movement of the carriage 4. Thus, the bread B is never jumped out from the inlet port 2 to come out therefrom to the predetermined height. Thus, the bread can be easily nipped out from the toaster.

Figure 4:
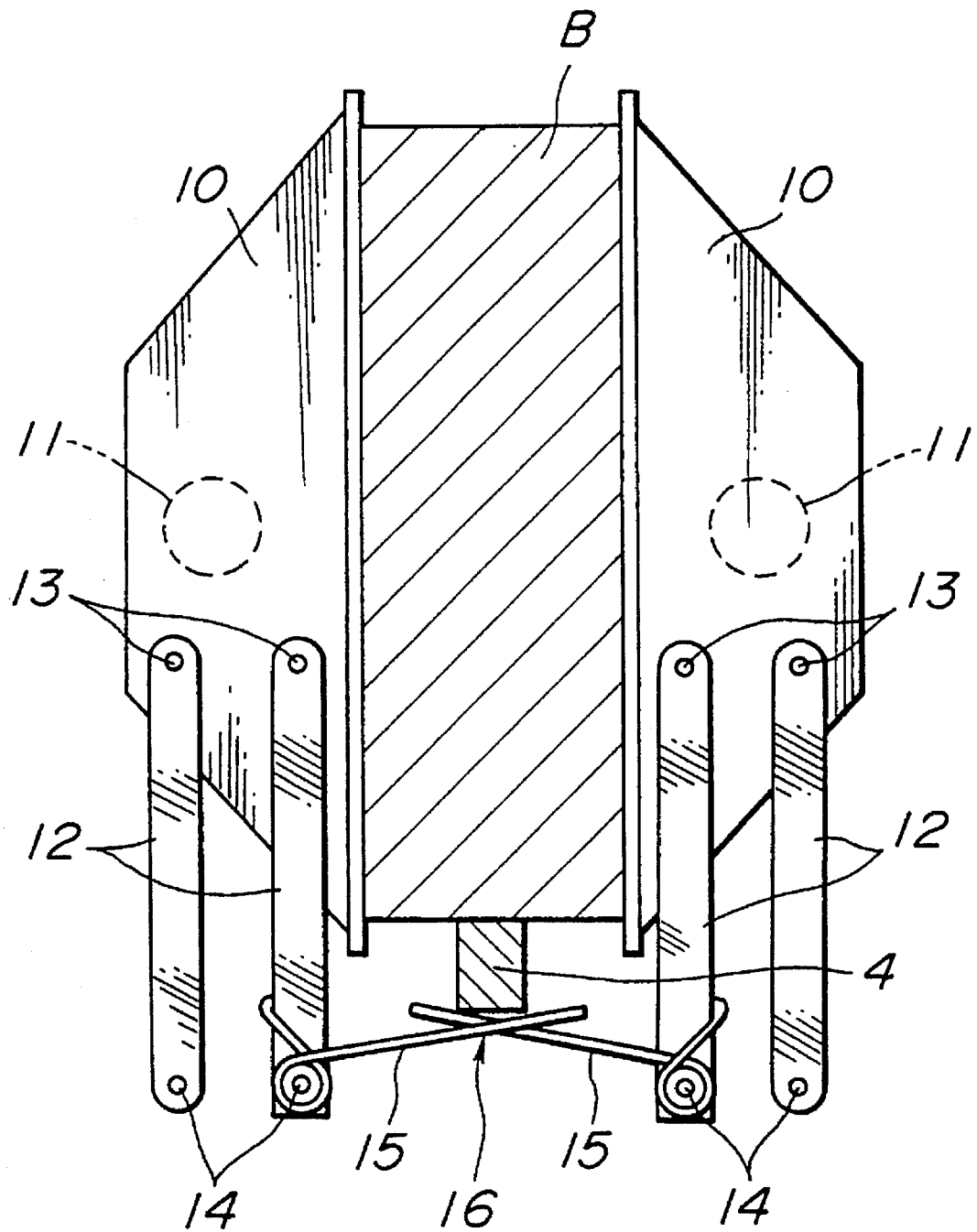
FIG. 4 is a cross-sectional side view showing a principal part according to another embodiment of the present invention.

Referring to FIG. 4, showing another embodiment of the present invention, the heating portion 10 may be supported by a parallel linking 12, 12. In this structure, the heating portion 10 can be further surely supported to prevent the portion from drifting.

According to the present invention as aforementioned, sliced bread having variety of sliced width can be surely held by the horizontally movable heating portions. Therefore, distance between the bread surface and the heating portion can be always maintained constant to provide a sufficient heat to the bread surface. Thus, sufficiently toasted bread can be obtained regardless with the sliced width thereof.

In addition, in the present invention, the movement of the carriage plate is directly received by the crossed springs. Therefore, supporting structure around the link can be simplified. The shape of the link is simplified to the approximate I-shape to allow manufacturing cost of the toaster to be reduced. Process for assembling the toaster can also be simplified because the link and the spring are not necessary to be flexibly fixed to the toaster body by another spring. The heating portion can be moved toward and apart from the toaster body only by the spring force generated from the cooperation of the crossed portion and the carriage plate.

While the present invention has been disclosed in terms of the preferred embodiment in order to facilitate better understanding of the invention, it should be appreciated that the invention can be embodied in various ways without depending from the principle of the invention. Therefore, the invention should be understood to include all possible embodiments and modification to the shown embodiments which can be embodied without departing from the principle of the inventions as set forth in the appended claims.

What is claimed is:

1. A toaster having a toaster body, and a bread inlet port formed of a longitudinally extended opening opened at the top portion of said toaster body, comprising;

a pair of heating members respectively including heaters being parallely installed to a lower portion of said inlet port at adjacent a lengthwisely extended side wall of said toaster body horizontally movably toward and apart therefrom, a carriage member downwardly movably installed to the bottom portion of said inlet port to receive the sliced bread inserted therefrom, and a space regulating member including a link of which a first end being pivotably fixed to the widthwisely extended side surface of said heating member at adjacent gravity center thereof and a second end being pivotably supported by said toaster body, and a spring attached to the position where said second end of the link being supported and linearly extended toward the bottom of said carriage member to receive said carriage member moved toward said spring, said link being pivotably moved cooperating with the spring force of said spring with the reception of said carriage member to horizontally move said heating member toward and apart from the lengthwisely extended side wall of said toaster body.

2. A toaster as set forth in claim 1, wherein the spring of said space regulating member forms a crossed portion with another spring of the faced space regulating member installed to the faced heating member to receive said carriage member.

3. A toaster as set forth in claim 1, wherein said link is shaped in an approximate I-shape.

4. A toaster as set forth in claim 1 further includes a stabilizing member to prevent drifting of said heating member, which is installed to the widthwisely extended side surface of said heating member at adjacent gravity center thereof.

5. A toaster as set forth in claim 4, wherein said stabilizing member is parallely installed to said link of the space regulating member to form parallel linking therewith.

6. A toaster as set forth in claim 4, wherein said stabilizing member is formed of an approximately I-shaped link of which one end is pivotably fixed to said heating member.

* * * * *